Oct. 8, 1935.  E. J. PILBLAD ET AL  2,016,837
BRAKE LOCKING DEVICE FOR MOTOR VEHICLES
Filed Oct. 28, 1932   2 Sheets-Sheet 1
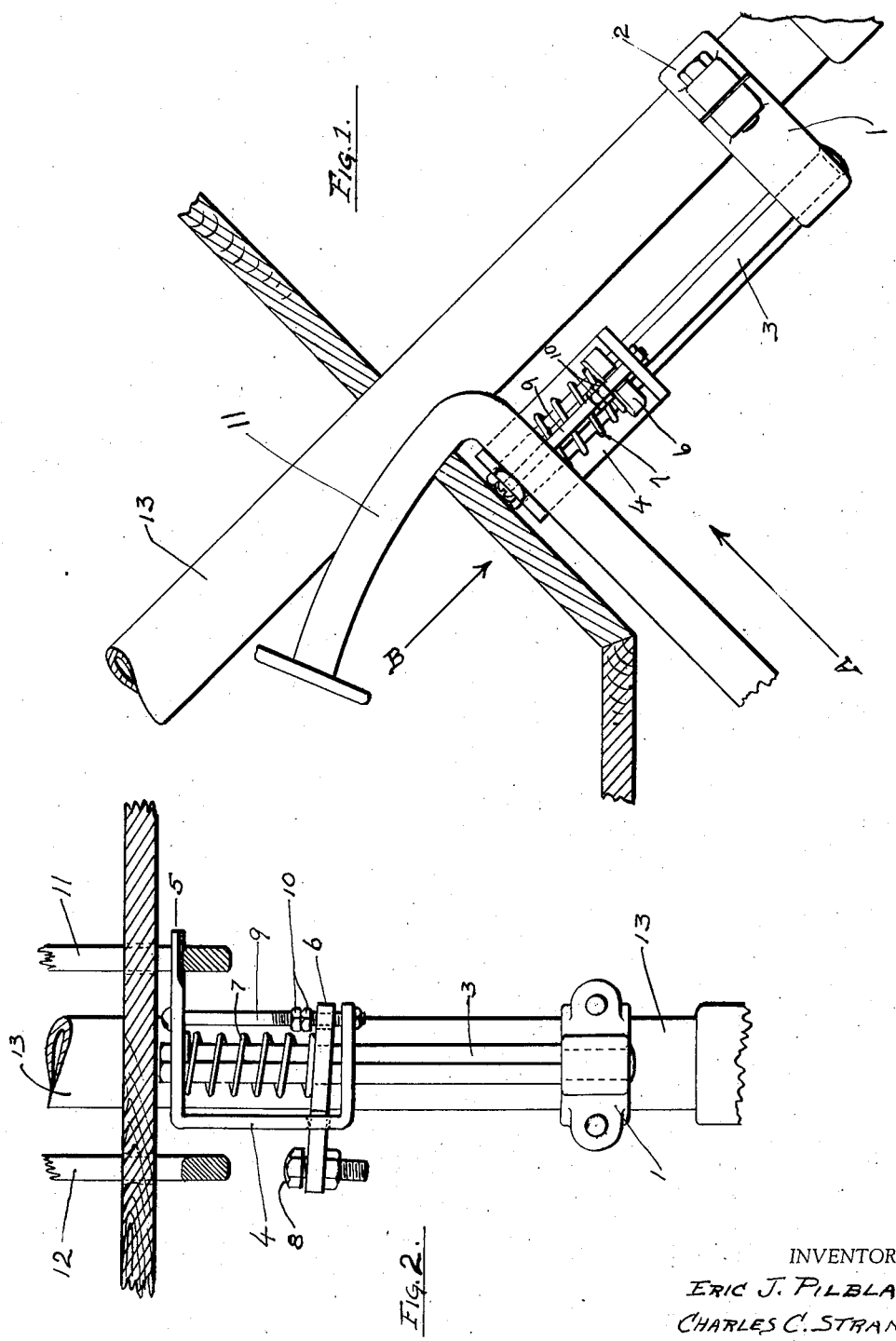
INVENTORS
ERIC J. PILBLAD &
CHARLES C. STRANGE.

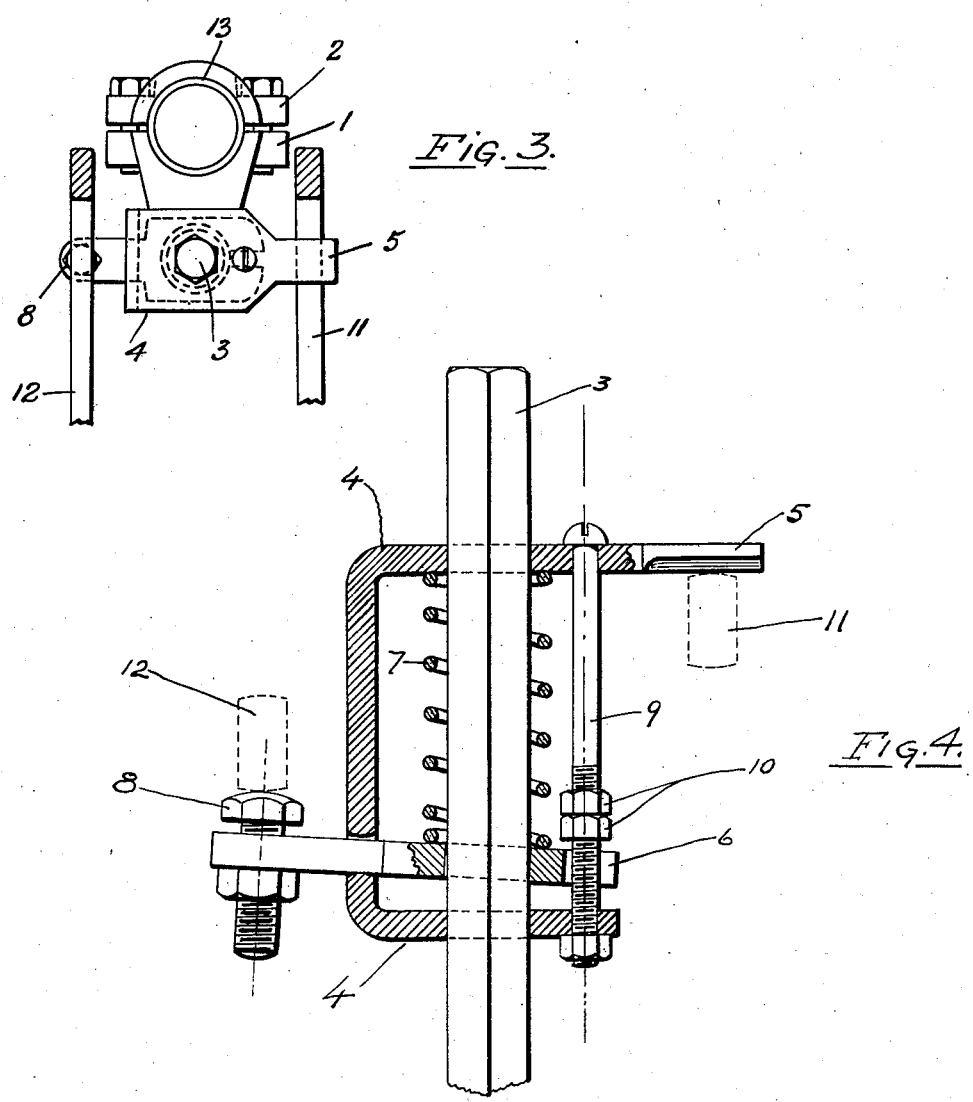

Patented Oct. 8, 1935

2,016,837

UNITED STATES PATENT OFFICE 2,016,837

BRAKE LOCKING DEVICE FOR MOTOR VEHICLES

Eric J. Pilblad and Charles C. Strange, Rockville Centre, N. Y.

Application October 28, 1932, Serial No. 639,999

20 Claims. (Cl. 192—13)

This invention relates to control means and more particularly to apparatus for controlling the operation of lever devices such as, for example, the brake and clutch pedals of an automotive vehicle.

One of the objects of the present invention is to provide novel means for controlling the operation of one lever through the movement of a second lever or the like.

Another object of the invention is to provide novel means for automatically locking the brake mechanism of a vehicle in its operative position by the normal operation of the clutch and brake mechanisms when bringing the vehicle to a stop.

Another object is to provide a novel brake locking device for automotive vehicles whereby the brakes may be automatically released at the desired instant during the normal engaging movement of the clutch pedal.

A further object of the invention is to so arrange the parts that the action of the device becomes automatic through the regular sequence of brake and clutch pedal action in bringing the motor vehicle to a stop and again starting the vehicle into motion.

Another object of the invention is to have the different parts so disposed that the device is inoperative while the brakes are being used only for regulating the speed of the car, (i. e. without using the clutch mechanism).

A still further object of the invention is to provide simple and inexpensive means for attaching the device to the motor vehicle.

The invention also consists of certain other features of design and construction in combination and arrangement of the several parts which will be described hereafter in detail in the accompanying specification, illustrated by the drawings and pointed out in the appended claims.

In describing our invention reference will be had to the accompanying drawings where similar letters and figures of reference indicate like parts throughout the several views.

Figure 1 is a sectional side view through part of a vehicle showing the invention as applied to the vehicle and its relation to the clutch and brake pedals of the vehicle.

Figure 2 shows an elevation of parts shown in Figure 1 viewed from the direction indicated by arrow A in Figure 1.

Figure 3 is a plan view of parts shown in Figure 1 viewed from the direction indicated by arrow B in Figure 1.

Figure 4 is larger scale view shown partly in section illustrating the several actuating parts of the invention in their relations to each other. The view point is same as in Figure 2.

One form of the present invention has been illustrated by way of example as a brake-locking device for automotive vehicles. As shown in the drawings, 1 indicates a bracket and 2 a clamp adapted to clamp around the steering column 13 of the vehicle. 3 is a rod or shaft rigidly attached to bracket 1, said rod or shaft being shown as having a hexagonal cross section. 4 is a U shaped frame having two aligned holes of such size that the frame is easily slidable on rod 3, the hexagonal shape preventing any rotational movement of the frame on said rod. 5 is a narrowed extension of the U shaped frame adapted to pass over the upper edge of brake pedal 11 of the vehicle and 6 is a locking pawl pivotally supported through a slot in frame 4. The pawl contains a hole of a size large enough to pass freely over the hexagonal rod 3 when the pawl and rod are at right angles to each other, but small enough so that when the pawl is tilted relative to the longitudinal axis of said rod by the action of spring 7 its pinching action is sufficient to prevent upward movement of the frame 4 by any pressure exerted on arm 5 by the brake pedal 11. We have found by experiment that the best locking action is obtained when the thickness of pawl 6 does not exceed ⅖ of the mean diameter of the rod 3, and the difference in size between the hole in pawl 6 and the diameter of rod 3 is such that locking action occurs when the pawl 6 assumes an angle of from 1½ to 5 degrees out of square with rod 3. That part of pawl 6 passing through frame 4 is extended laterally far enough to reach under the clutch pedal 12 of the vehicle. 8 is an adjusting screw placed adjacent the end of said extending portion of pawl 6, said screw being located in the path of the clutch pedal 12. In normal operation screw 8 is preferably so adjusted that the clutch mechanism of the vehicle will be disengaged at the instant of, or just prior to, the engagement of clutch pedal 12 with said screw during the downward movement of said pedal, thereby permitting the clutch mechanism to be disengaged without actuation of the brake pedal. In addition, by this arrangement of parts, the operation will, as hereinafter pointed out, be such that the brakes will be fully released at the same instant that a driving engagement of the clutch mechanism is established when the release of the brakes is controlled by the clutch pedal. 9 is a tie rod for preventing arm 5 from deflecting under the pressure of brake pedal 11. The end of pawl 6 is forked to straddle this tie rod, the latter having adjustable stop nuts 10 threadedly mounted thereon to act as a definite stop for pawl 6 at the point at which said pawl is at right angles to rod 3 thus allowing the frame free movement on the rod 3 when said pawl is held in such a position by the action of clutch pedal 12.

After the foregoing references, it is thought that it will now be easy to follow the operation of the device.

When only using the brake for modifying the speed of the car (i. e. with clutch pedal in its normal engaged position) it is obvious that the device remains inoperative as there is nothing to interfere with the action of the brake pedal, the frame 4 remaining in its normal inoperative position on the rod 3 through the frictional resistance set up between pawl 6 and rod 3 by action of spring 7.

When a stop of the vehicle is desired, the brake pedal 11 and clutch pedal 12 are operated in the ordinary manner. After the vehicle has come to a stop and while clutch pedal 12 is depressed, the gears are shifted into neutral in the normal way, the right foot being kept on the brake pedal. Next the clutch pedal is let back into its normal engaged position and the foot subsequently removed from the brake pedal, the latter being automatically held in depressed position by the locking mechanism. The brake locking device is rendered operative by the operation of the clutch and brake pedals in the foregoing manner as follows: As the clutch pedal is pressed down, its underside will strike adjusting screw 8 on pawl 6 and tilt the pawl 6 upward compressing spring 7 until the forked end of the pawl is brought up against stop nuts 10. The whole system suspended on frame 4 is now free to slide on rod 3 and will travel downward with the clutch pedal until arm 5 strikes the upper edge of brake pedal 11. When the clutch pedal is let back to normal (after gear shifting), thereby relieving the pressure on screw 8 on pawl 6 and permitting the latter to be instantly tilted down by spring 7 into locking position and by its locking action to securely lock frame 4 with its arm 5 to rod 3 thus holding brake pedal 11 in its depressed position thereby locking the braking system of the vehicle in applied position without the application of foot pressure on the brake pedal.

When it is desired to start the vehicle again the right foot can now be used on the accelerator to obtain the proper engine speed for starting the vehicle. The clutch is depressed with the left foot and the gears are shifted. This action of the clutch pedal releases the locking action of the pawl 6 by tilting the same upwardly. As clutch lever 12 is now let back into its normal operative position the frame 4 with its several parts will slide upwardly under the influence of the normal spring means provided in the vehicle for returning brake pedal 11 to its normal inoperative position. It will be seen that after brake pedal 11 has come to rest at its normal inoperative position and thereby brought frame 4 with its several parts to rest, the clutch pedal 12 still has a certain distance to travel before it comes to rest in its normal operative position. The several parts of the frame 4 are so disposed that the engaging of the clutch mechanism occurs during this distance of travel.

From the foregoing it will be seen that whenever the clutch pedal of the vehicle is depressed once, while the brakes are being applied through the foot brake pedal, the brakes will remain automatically locked. The vehicle will thus be prevented from rolling in either direction without the application of foot pressure to either the clutch or brake pedal. When it is desired to again start the vehicle the operator has his right foot free to accelerate the engine. The brakes are released at the proper instant by the normal action of the clutch pedal after the engine has been accelerated to the proper speed, thereby prohibiting any movement of the car before a driving connection is established between the engine and the wheels. The invention will thus prevent stalling of the engine and dangerous backward rolling of the car when starting on a grade, and obviate the fatiguing, frequent and lengthy manual applications of the foot brakes in traffic driving. It will also eliminate the necessity for a hand or parking brake system such as is now in use on all motor vehicles.

Although only one specific embodiment of the invention has been illustrated and described, it is to be expressly understood that the same is not limited thereto but that various changes may be made in the arrangement and design of parts illustrated without departing from the spirit of the invention as will now be apparent to those skilled in the art. Reference will primarily be had, therefore, to the appended claims for a definition of the limits of the invention.

We claim:

1. In combination with a motor vehicle and its brake and clutch mechanisms, a brake locking device of the character described comprising a fixed supporting element, a moveable element slideably mounted on said fixed supporting element, means on the moveable element to engage the brake pedal of the vehicle, means to automatically lock the moveable element to the fixed supporting element against any upward movement of the moveable element, and means to slide the moveable element into locking position and to release the locking action of said locking means through the movement of the clutch mechanism of the vehicle.

2. In combination with a motor vehicle and its brake and clutch mechanism a brake locking device of the character described comprising a rod adapted to be rigidly attached to some suitable part of the vehicle, an element slideably mounted on said rod, said slideably mounted element having a protruding portion adapted to engage the upper side of the brake pedal lever of the vehicle, locking means to resist any upward movement of said slideable element, and means to release the locking action of the above mentioned locking means through the action of operating the clutch pedal of the vehicle.

3. In combination with a motor vehicle and its brake and clutch mechanisms, a brake locking device of the character described comprising a rod adapted to be rigidly attached to some suitable part of the vehicle, an element slideably mounted on said rod, said slideably mounted element having a protruding portion adapted to engage the upper side of the brake pedal lever of the vehicle, locking means to resist any upward movement of said slideable element, and means to release the locking action of the above mentioned locking means through the action of operating the clutch pedal of the vehicle.

4. In combination with a motor vehicle and its brake and clutch mechanisms, a brake locking device of the character described comprising a rod adapted to be rigidly attached to some suitable part of the vehicle, an element slideably mounted on said rod, said slideable element having a protruding portion adapted to engage the upper side of the brake pedal lever of the vehicle, and a locking member pivotally supported in a slot on said slideably mounted element, said locking member having a hole of the same shape as said rigidly attached rod and mounted over said rod, the hole being of such size that the locking member will slide freely on the rod when held at right angles to the rod, but said hole being small enough so that when said locking member is tilted downward as far as the size of hole allows, the said locking member will lock on said rod and resist any upward movement of said slideably mounted element.

5. In combination with a motor vehicle and its brake and clutch mechanisms, a brake locking device of the character described comprising a rod adapted to be rigidly attached to some suitable part of the vehicle, an element slideably mounted on said rod, said slideable element having a protruding portion adapted to engage the upper side of the brake pedal lever of the vehicle, a locking member pivotally supported in a slot on said slideably mounted element, said locking member having a hole of the same shape as said rigidly attached rod and mounted over said rod, the hole being of such size that the locking member will slide freely on the rod when held at right angles to the rod, but said hole being small enough so that when locking member is tilted downward as far as size of hole allows the said locking member will lock on said rod and resist any upward movement by the said slideably mounted element, and resilient means to normally keep said locking member in a tilted locking position.

6. In combination with a motor vehicle and its brake and clutch mechanisms, a device of the character described comprising a rod adapted to be rigidly attached to a suitable part of the vehicle, a U shaped frame slideably mounted on said rod, an extended member of said frame engaging the upper side of the brake pedal lever of the vehicle, a locking member pivotally supported in said frame, and resilient means to normally keep said locking member tilted to a locking position.

7. In combination with a motor vehicle and its brake and clutch mechanism, a brake locking device of the character described comprising a rod adapted to be rigidly attached to a suitable part of the vehicle, a U shaped frame slideably mounted on said rod, an extended member of said frame engaging the upper side of the brake pedal lever of the vehicle a locking member pivotally supported in said frame, and resilient means to normally keep said locking member tilted to a locking position, the said locking member having an extension outside the said U shaped frame to extend under the clutch pedal of the vehicle.

8. In combination with a motor vehicle and its brake and clutch mechanisms a brake locking device of the character described comprising a rod adapted to be rigidly attached to a suitable part of the vehicle, a U shaped frame slideably mounted on said rod, an extended member of said frame engaging the upper side of the brake pedal lever of the vehicle, a locking member pivotally supported in said frame, resilient means to normally keep said locking member tilted to a locking position, the said locking member having an extension outside the said U shaped frame to extend under the clutch pedal of the vehicle, and means on said locking member extension for adjustment to time the contact of clutch pedal lever and said adjusting means to the moment when clutch mechanism is fully disengaged.

9. In combination with a motor vehicle and its brake and clutch mechanisms, a brake locking device of the character described comprising a rod rigidly attached to some part of the vehicle, a frame slideably mounted on said rod, a member of said frame engaging the brake pedal lever of the vehicle, a locking member normally locking the frame to the rod against upward movement, the locking member having an extension with adjustable means disposed so to engage the underside of the clutch pedal lever of the vehicle, and stop means to hold the locking member at its free non-locking position when acted upon by the clutch pedal of the vehicle.

10. In combination with a motor vehicle and its brake and clutch mechanisms, a brake locking device of the character described comprising a rod rigidly attached by a bracket to the steering column of the vehicle, a frame slideably mounted on said rod, a member of said frame engaging the brake pedal lever of the vehicle, a locking member normally locking the frame to the rod against upward movement, the locking member having an extension with adjustable means disposed to engage the underside of the clutch pedal lever of the vehicle, and stop means to hold the locking member at its free non-locking position when acted upon by the clutch pedal of the vehicle.

11. In combination with the brake and clutch mechanism of a motor vehicle, longitudinally movable means for holding the brake mechanism in braking position, said means including a member adapted to be engaged by the clutch mechanism for releasing the holding means, and means for yieldingly holding said member in locking position.

12. In apparatus of the class described, a brake pedal, a clutch pedal, and means adapted to engage the brake pedal to hold the same in brake applying position, said means being mounted independently of said brake pedal, and including a member adapted to be engaged by the clutch pedal to render said means operable, and a member adapted to engage the brake pedal, said first named member having limited movement with respect to the second named member.

13. In apparatus of the class described, brake mechanism including a brake pedal, a clutch pedal, and means movable independently of said brake pedal including a member adapted to engage the brake pedal to hold said pedal in brake applying position, and a member adapted to be engaged by said clutch pedal to render said means operable, the second named member being yieldingly held in a predetermined position with respect to the first named member.

14. In combination with the brake and clutch pedals of a vehicle, a brake locking device comprising a guide member rigidly mounted on the vehicle, a movable member slidably supported by said guide member, a lateraly extending projection on said movable member adapted to engage the top of the brake pedal, locking means including a pivoted member and resilient means for locking said movable member to said fixed member to hold said brake pedal in depressed position, and means actuated by the clutch pedal for controlling said locking means.

15. In combination with the brake and clutch mechanisms of a vehicle, a brake locking unit including a fixed member and a movable member, the latter having a portion adapted to engage the top of the brake pedal, means for holding said movable member against gravitational movement in one direction and locking the same against movement in the opposite direction, whereby said unit is adapted to hold the brake pedal in depressed position, and means for controlling the movement of said movable element through movement of the clutch pedal.

16. In combination with the brake and clutch mechanisms of a vehicle, a brake locking device comprising a fixed supporting element, a movable element slidably supported by said supporting element for movement independently of the brake mechanism, means for locking said movable element to said supporting element, means secured to the movable element adapted to engage the brake pedal to hold the brakes in applied position, and means actuated by the clutch mechanism for releasing said holding means.

17. In combination with the brake and clutch mechanisms of a vehicle, a brake locking device comprising a fixed supporting element, a movable element slidably supported by said supporting element, said movable element being disconnected from, but adapted to engage, the brake pedal, means for locking said movable element to said supporting element to hold the former against movement relative to the latter, and means for releasing said holding means through the movement of the clutch mechanism.

18. In combination with the brake and clutch mechanisms of a vehicle, a brake locking device comprising a fixed member, a movable member slidably supported by said fixed member, means for holding said movable member against movement relative to said fixed member, means carried by said movable member and adapted to move in the path of, and engage, said brake pedal to hold the brakes in applied position, said brake pedal being normally free for movement independently of said movable member, and means controlled by the clutch pedal for releasing said holding means.

19. In combination with the brake and clutch pedals a brake locking device comprising a fixed member, a movable member supported by said fixed member for linear movement, said movable member being adapted to engage the upper side of the brake pedal, locking means for locking said movable member against movement in one direction relative to said fixed member, resilient means for normally holding said locking means in operative position, and means for releasing said locking means through movement of the clutch mechanism.

20. In combination with the brake and clutch mechanism of a motor vehicle, a longitudinally movable member adapted to engage said brake mechanism, locking means associated with said member whereby said brake mechanism is held in braking position, said locking means including a member adapted to be engaged by the clutch mechanism for releasing said longitudinally movable member, and yielding means for normally rendering said locking means operative.

ERIC J. PILBLAD.
CHARLES C. STRANGE.